US006742051B1

(12) United States Patent
Bakshi et al.

(10) Patent No.: US 6,742,051 B1
(45) Date of Patent: May 25, 2004

(54) KERNEL INTERFACE

(75) Inventors: Bikram Singh Bakshi, Portland, OR (US); Frank L. Berry, North Plains, OR (US); Ed Gronke, Portland, OR (US); Ellen Deleganes, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/386,517

(22) Filed: Aug. 31, 1999

(51) Int. Cl.⁷ .............................................. G06F 9/46
(52) U.S. Cl. ..................................... 709/318; 709/328
(58) Field of Search .............................. 709/310–318, 709/223, 328, 200, 201

(56) References Cited

U.S. PATENT DOCUMENTS

| | | | |
|---|---|---|---|
| 5,659,794 A | * | 8/1997 | Caldarale et al. ............... 710/1 |
| 6,131,118 A | * | 10/2000 | Stupek, Jr. et al. .......... 709/223 |
| 6,157,965 A | * | 12/2000 | Mohammed et al. ........... 710/8 |

OTHER PUBLICATIONS

–Helmy "Protocol Independent Multicast–Sparse Model (PIM–SM): Implementation Document", Computer Science Department/ISI, University of South California, Jan. 19, 1997. pp. 1–18.*

Virtual Interface Architecture Specification, Version 1.0 Dec. 16, 1997; pp. 1–83.

* cited by examiner

Primary Examiner—John Follansbee
Assistant Examiner—V. H. Nguyen
(74) Attorney, Agent, or Firm—John F. Kacvinsky

(57) ABSTRACT

In an example embodiment, an interface is provided between a software application and a hardware device transferring data between the software application and a network. The interface posts a request from the software application and, in response to a first polling inquiry received from the software application, determines whether or not an event signal corresponding to the request has been provided to it from the hardware device. The interface carries out a rearm routine if an event signal has not been provided at the time of the polling inquiry. A second polling inquiry is made by the software application after the interface is rearmed and the interface determines whether or not an event signal has been provided to it by the hardware device. The interface then carries out a wait routine which waits for the event signal if an event signal was not provided at the time of the second polling inquiry.

19 Claims, 8 Drawing Sheets

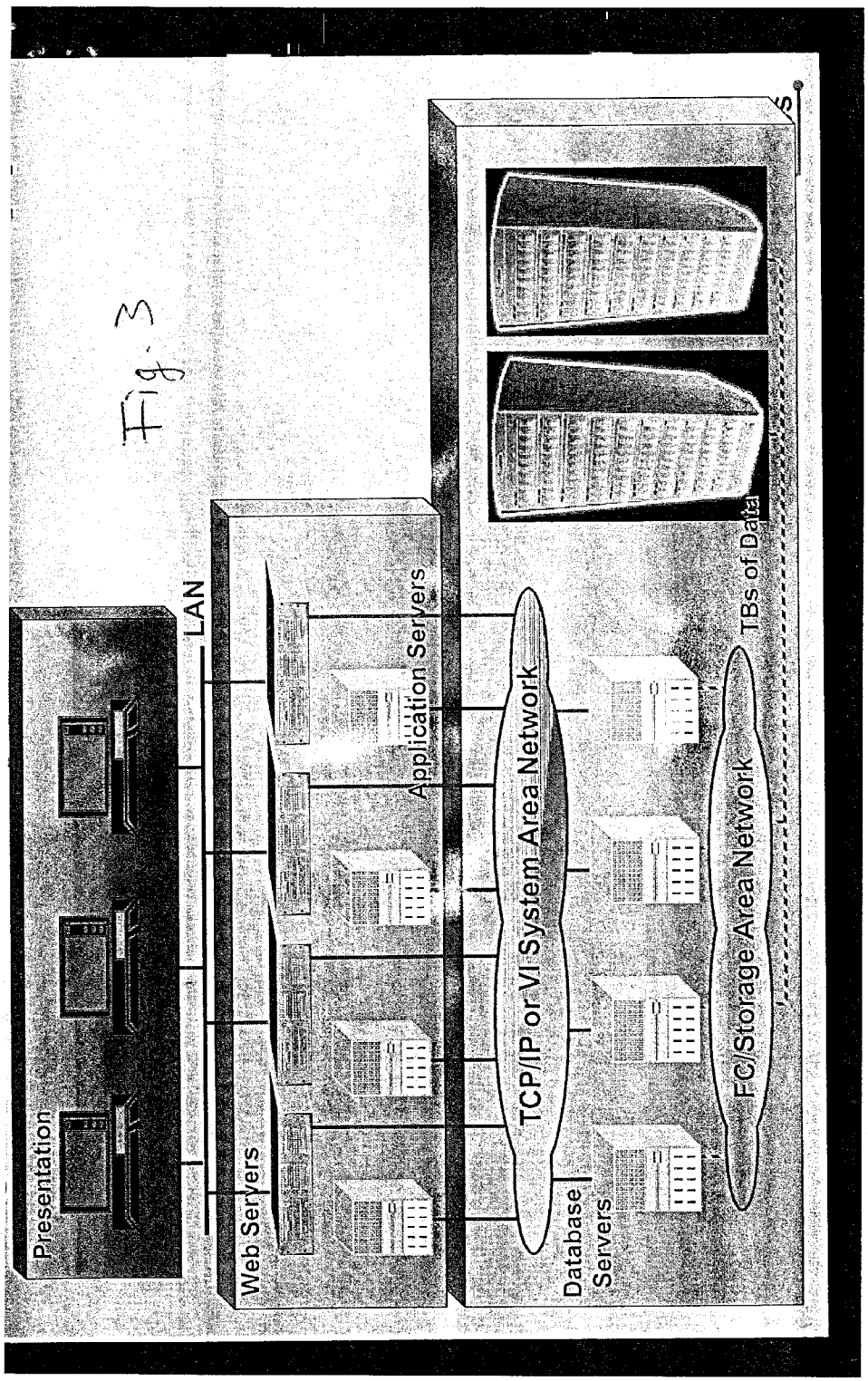

KERNEL INTERFACE

BACKGROUND

1. Field of the Invention

This invention relates generally to data communications between a device and a network. In particular, the present invention relates to software interfaces configured to enable an increase in the speed of data communications between a device and a network.

2. Description of the Related Art

In conventional networks, the various devices on the network are virtualized into a set of start and/or end points (nodes) for data messages transferred over the network. The network has a switching fabric consisting of routers, switches, etc., which provides the logical communication links between the nodes on the network. Each node has a hardware device, typically a network interface controller (NIC), acting as the communications intermediary between the node and the network. The NIC merely passes data to and from the network in the speed and manner required by the switching fabric and is thus usually categorized by the nature of the network with which it is compatible. For example, Ethernet NICs, the most common form of network adapters, can transfer data at rates of 10 megabytes per second, 100 megabytes per second, or one gigabyte per second. The NIC does not control, distinguish or review the data being passed. Instead, a layered stack of software in each device controls the communications between the resources in the device and the network. In a computer server, there may be a large amount of data storage and communications functionality and the demand for access to the hardware device may be complex.

The communications path of a typical device 100 is illustrated in FIG. 1. As shown, an Ethernet NIC 101 interacts strictly with the network and with device driver 102 of node 100. The device driver 102 is a dedicated piece of software that controls the lowest level functions of Ethernet NIC 101. Device driver 102 is strictly connected to a transport 103, which in turn is strictly connected to a transport interface 104. The transport interface 104 is typically a module of an operating system (OS) which controls and multiplexes direct access by software processes to transport 103. The software stack, especially in the instance of a server, can be quite complex. The software stack implements transport and other protocols (e.g., TCP, IP) at various levels to render communications over the network switching fabric more reliable. The multiplexing and demultiplexing processes and the reliability protocols are computationally expensive. Most conventional communication operations result in buffer copies being made at multiple levels or layers, mode switches and context switches. Moreover, many user application software programs utilize methods which inevitably slow down communications. As shown in FIG. 2, the amount of time required to transfer data between nodes on a high speed network is affected much more by the time it takes to execute all of the layers in the software protocol stack than by the time taken by the hardware to transfer the data. As shown by FIG. 2, with the advent of gigabit ethernet, the overwhelming obstacle to high speed performance is the execution of the software protocol stack rather than the hardware in the network adapter cards.

The example embodiment of the invention seeks to increase the speed of data communications over the network by decreasing the execution time of the software protocol stack. One particular concern is the synchronous application programming interface (API) calls in user applications that block (wait) for operation completion, either in client-server or peer-peer communication. While some user application support asynchronous operations, they make extensive use of callbacks, which offer a convenient way for applications to be notified when an event of interest occurs. However, certain properties of callbacks manifest themselves into serious issues when trying to decrease execution time of the software. Examples of such properties include:

1. Time restriction on callback thread to prevent starvation of other clients that have registered for a callback.
2. Each asynchronous event notification requires registering for a callback. Bundling multiple async event notifications in one callback is not easily possible. This limits scalability since performance is adversely affected as the number of async operations requiring callbacks increases.
3. Supporting callback mechanisms complicates the architecture of the interface provider.

While such callbacks may be acceptable in user space, doing so in the kernel would waste precious CPU cycles adversely impacting system performance as well as scalability. Therefore, a need exists for a completely asynchronous interface to the hardware device responsible for handling communication and error reporting without using callbacks.

SUMMARY

The present invention is directed to a software interface. In an example embodiment, an interface is provided between a software application and a hardware device transferring data between the software application and a network. The interface posts a request from the software application and, in response to a polling inquiry received from the software application, determines whether or not an event signal corresponding to the request has been provided to it from the hardware device. The interface carries out a rearm routine if an event signal has not been provided at the time of the polling inquiry. A second polling inquiry is made by the software application after the interface is rearmed and the interface determines whether or not an event signal has been provided to it by the hardware device. The interface then carries out a wait routine which waits for the event signal if an event signal was not provided at the time of the second polling inquiry.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of the invention. While the foregoing and following written and illustrated disclosure focuses on disclosing example embodiments of the invention, it should be clearly understood that the same is by way of illustration and example only and is not to be taken by way of limitation.

FIG. 3 shows a possible three tier web/application/database cluster in which an example embodiment of the present invention may be implemented.

DETAILED DESCRIPTION

Figure 1:
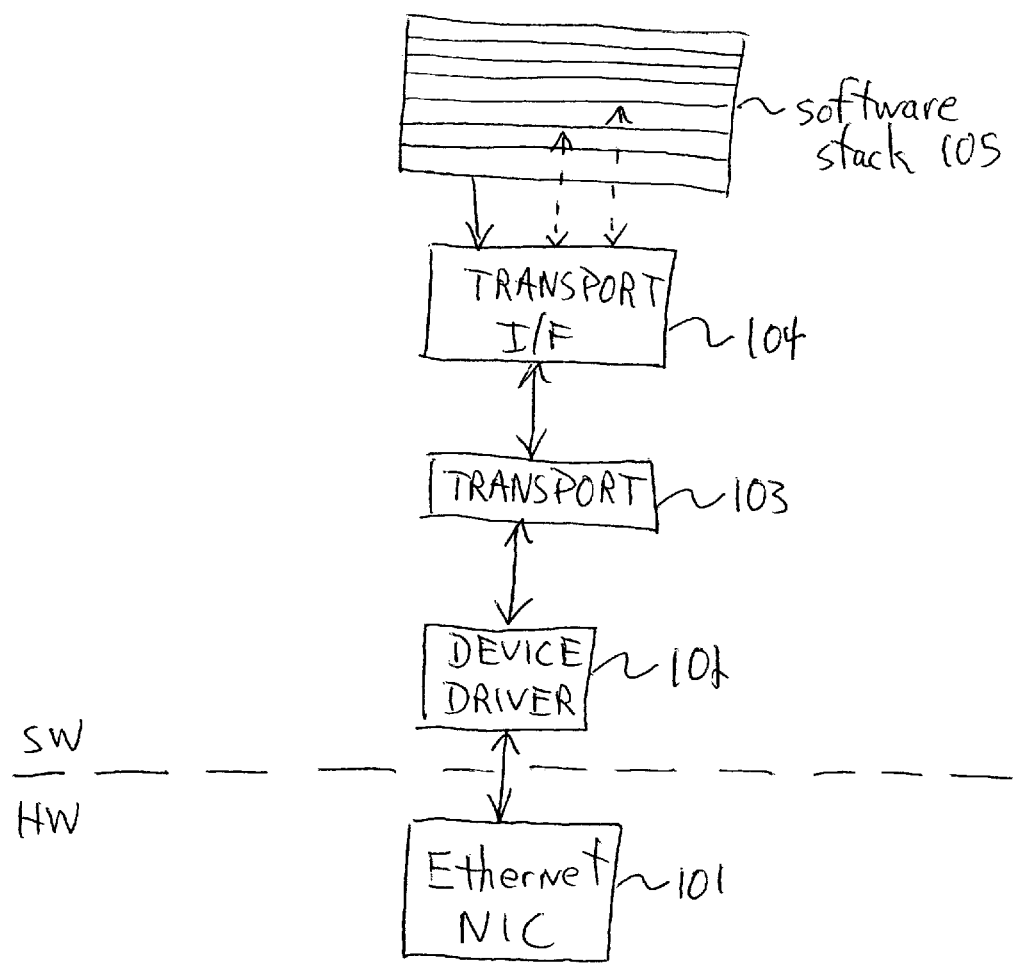
FIG. 1 is a block diagram of the communications path in a typical network node.
Figure 2:
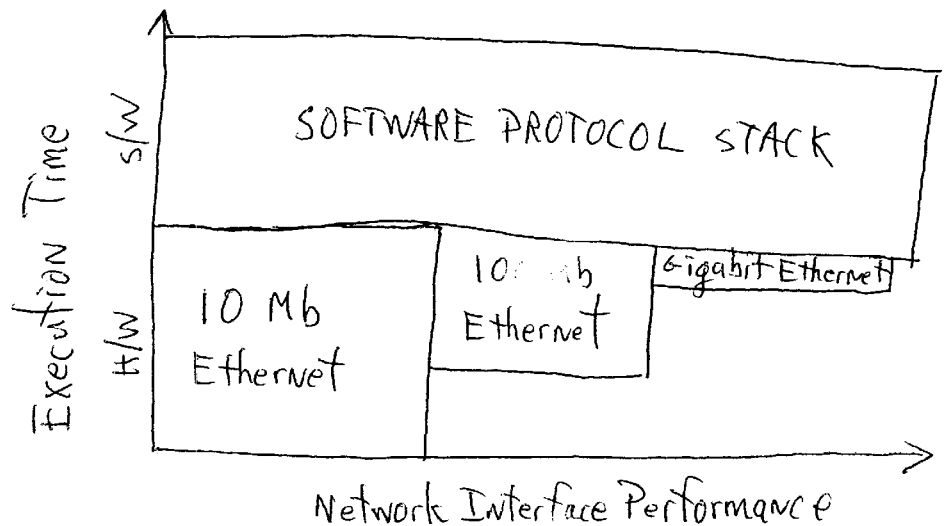
FIG. 2 is an illustration useful for pointing out the effect of execution time for software protocol stacks on the transfer of data between nodes on a network.

An example embodiment of the invention described in this application is a kernel interface especially suited for in-kernel applications requiring completely asynchronous interaction in a Virtual Interface (VI) architecture. The kernel interface is optimized to be a very flexible and highly efficient interface to the VI architecture, any emulation or modification of the VI architecture as may currently exist or hereafter be developed, and like architectures. However, there are several aspects of the invention which make it desirable for implementation in an embodiment other than the kernel interface of the example embodiment optimized for VI. An interface other than the kernel interface of the example embodiment could be implemented, for example, elsewhere in the software interfacing with VI architecture, an emulation or modification of the VI architecture as may currently exist or hereafter be developed, and like architectures. The interface of the example embodiment could also be implemented in kernel applications and user applications for devices which do not utilize the VI architecture. However, the scope of the present invention includes other software interfaces which may have different requirements and certain changes and extensions not found in the kernel interface of the example embodiment.

Furthermore, the kernel interface in the example embodiment of the invention described in this application is implemented in a hardware device compliant with the Next Generation I/O (NGIO) architecture. The example embodiment and other embodiments of the invention can be implemented in conjunction with other types of switch fabric-based I/O architectures. The example embodiment NGIO uses a similar model for input/output data transfer as is specified by the VI architecture. A highly efficient interface such as the kernel interface in the example embodiment may thus be beneficially used by various computer devices having NGIO hardware connected to a network fabric. However, the example embodiment and other embodiments of the invention may also be used with non-NGIO hardware.

Similarly, a preferred implementation of the example embodiment is in the input/output control circuit of a server or other network device having VI enabled hardware, as well as a processor such as the Intel Pentium II Xeon™ or Pentium III Xeon™ processor. However, such an implementation is but one possible application of the example embodiment which may, of course, be applied in any device having a processor and an input/output circuit and indeed in any server architecture where an improvement in the speed of communications with a network is desired for whatever reason.

1.0 Network Environment

In order to illustrate a possible implementation of the example embodiment of the invention, a three tier web/application/database cluster is shown in FIG. 3. In order to help explain the network alternatives, the cluster is shown as having either a TCP/IP or VI System Area Network (SAN) 10 connected to a plurality of application servers 11 and web servers 12. There are a plurality of user terminals 14 connected to web servers 12 over a local area network (LAN) 15. The TCP/IP or VI System Area Network 10 is also connected to database servers 13, which in turn are connected to mass storage devices 16 capable of storing and quickly transferring terabytes of data over a FC/Storage Area Network 17.

Figure 4:
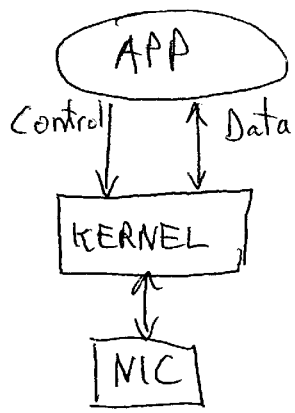
FIG. 4 is a generalized block diagram showing the data transfer architecture that may be utilized in a conventional TCP/IP network.
Figure 5:
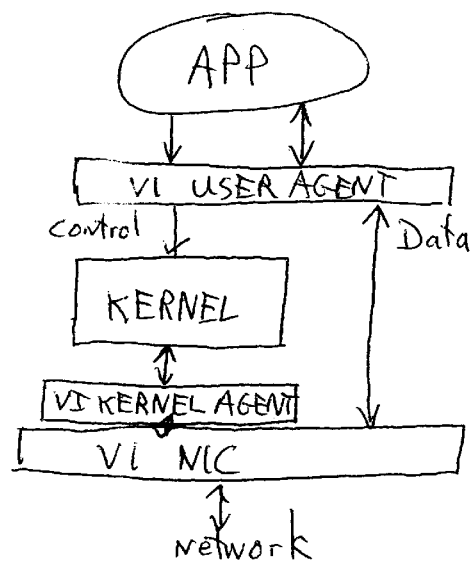
FIG. 5 is a generalized block diagram showing the VI architecture with which an example embodiment of the present invention may be used.

The VI architecture has recently been developed as an improvement over TCP/IP in clustered network environments. The Transmission Control Protocol (TCP) is a sliding window flow control protocol that uses sequence numbers, acknowledgments, error detection, retransmission of lost packets, etc., where the underlying network environment is presumed to be inherently unreliable. However, the centralized in-kernel protocol processing in TCP/IP networks (see FIG. 4) prohibits applications from realizing the potential raw hardware performance offered by underlying high-speed networks. In contrast, the Virtual Interface (VI) Architecture (see FIG. 5) enables distributed applications to perform low overhead communication over System Area Networks (SANs), which are high-bandwidth, low-latency networks interconnecting nodes within a distributed computer system. VI is described in the Virtual Interface Architecture Specification, Version 1.0, Dec. 16, 1997, jointly authored by Intel Corporation, Microsoft Corporation, and Compaq Computer Corporation, and makes it possible to perform low overhead communication using off-the shelf SAN hardware.

It is impractical to implement existing many network protocols such as TCP over VI Architecture because this would result in unnecessary additional overhead. SANs have very low error rates and high reliability levels in conjunction with VI Architecture (reliable delivery and reliable reception). Transport errors are rare. They are considered catastrophic and the connection is broken when they occur. Thus, many of the functions performed by TCP to ensure reliability are redundant and would add unnecessary overhead. Therefore, the network environment will usually dictate whether a TCP/IP network or VI SAN network is appropriate.

2.0 The VI Architecture Model

Before the example embodiment of the present invention will be described in detail, the basic VI Architectural model will first be described with reference to FIG. 6. As will become apparent, the VI architecture provides a user application with direct data access to the network interface hardware in a fully protected fashion. It thus avoids intermediate data copies and bypasses the operating system in order to achieve low latency, high bandwidth, data transfer.

Figure 6:
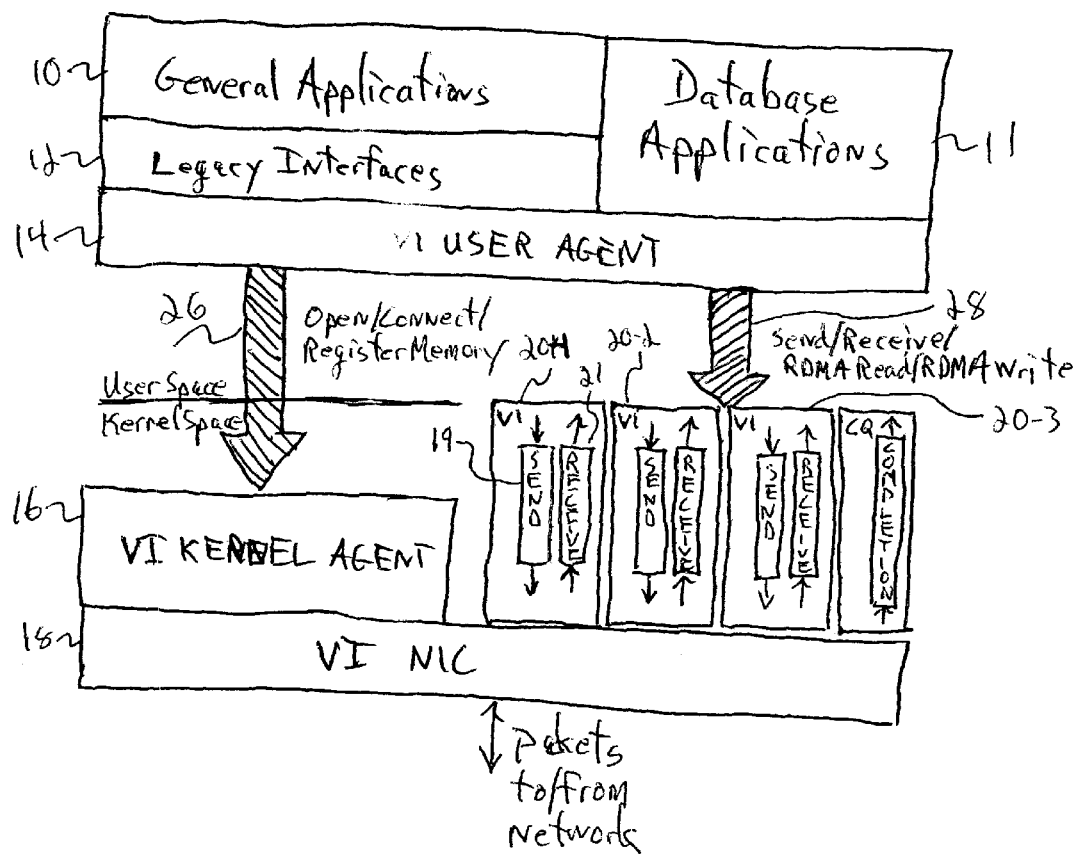
FIG. 6 is a block diagram of the VI architecture model.

As shown in FIG. 6, the VI Architectural model includes several different Virtual Interfaces (VIs) 20-1 to 20-3 between a VI user agent 14 and a VI network interface controller (NIC) hardware 18 (such as the GNN1000 of the cLAN product family, available from GigaNet, Inc.). The VI user agent 14 provides communications for software processes through a VI. The software processes may include general application programs 10 using legacy interfaces 12 (for example, an operating system communications facility such as, e.g., Sockets, Remote Procedure Call or RPC, MPI) between the general application programs 10 and VI user agent 14. The software process may also be application programs 11, such as database applications in the example of FIG. 6, which do not need legacy interfaces 12.

Figure 7:
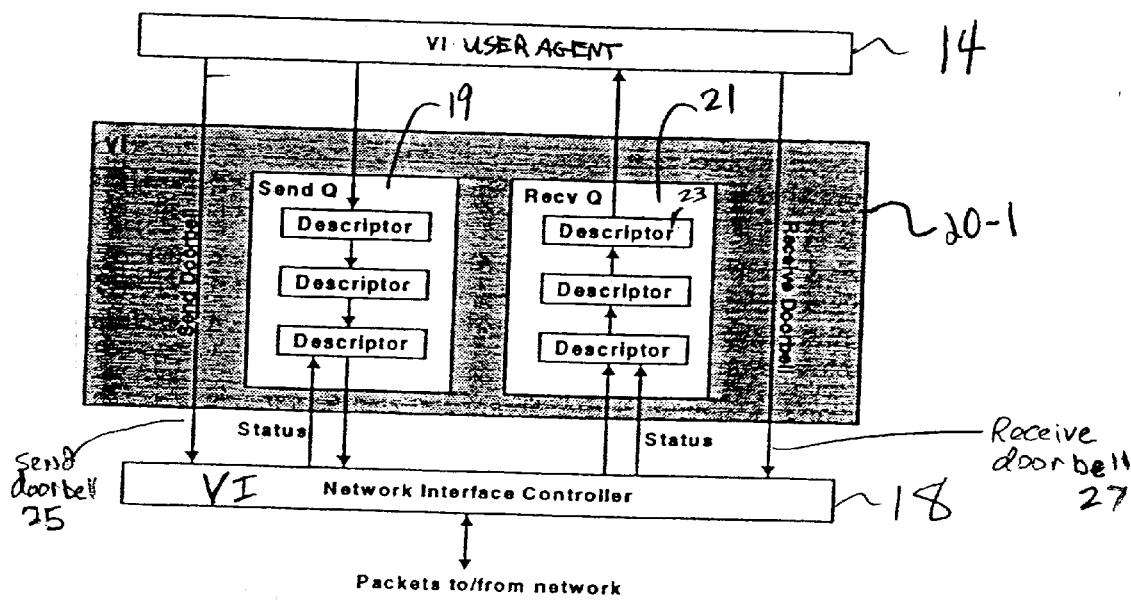
FIG. 7 is a block diagram of the virtual interfaces in the VI architecture model.

Each one of the VIs 20-1 to 20-3 in FIG. 6 can have the details shown in FIG. 7. (Only VI 20-1 is shown for the sake of simplicity.) VI 20-1 is configured to directly access the process' memory for data transfer operations between the software application and the network. In particular, it includes a pair of work queues, one for send operations (a send queue 21) and one for receive operations (receive queue 19). The work queues store one or more descriptors 23 between the time it is Posted (placed in the queue) and the time it is Done (when the VI NIC 18 has completed processing it). The descriptor 23 is a data structure recognizable by the VI NIC 18 that describes a data movement request, and it includes a list of segments (a control segment, an optional address segment and one or more data segments). The control segment identifies the type of VI NIC 18 data movement operation to be performed and the status of a completed NIC data movement operation. The data segment describes a communications buffer for a VI NIC data 18 movement operations. A receive queue 19 contains descriptors that describe where to place incoming data. A send queue 21 contains descriptors that describe the data to be transmitted. A pair of VIs are associated using connection primitives (e.g., VipConnectWait, VipConnectAccept, VipConnectRequest) to allow packets sent at one VI to be received at the other VI. A send doorbell 25 and a receive doorbell 27 are provided for allowing the user software process or application to notify the VI NIC 18 that work (a descriptor describing a requested data transfer operation) has been placed in the send queue 19 and receive queue 21, respectively.

Referring to FIG. 6 again, the VI user agent 14 is a software component that enables legacy interfaces 12 and database applications 11 to utilize VI NIC 18. The VI user agent 14, in part, abstracts the details of the underlying VI NIC 18 hardware in accordance with API(s) defined by the legacy interfaces 12. The APIs in VI user agent 14 primarily focus on providing primitives for synchronous communication with the VI hardware; the asynchronous operations being facilitated by means of callbacks as discussed in the Description of the Related Art above. The VI user agent 14 includes a library of primitives, known as the Virtual Interface Primitives Library (VIPL) which receives commands from legacy interfaces 12 and provides one or more functions corresponding to each command. The functions include those for creating a VI (VipCreateVI), for destroying a VI (VipDestroyVI), for connecting one VI to another VI (e.g., VipConnectWait, VipConnectRequest), for accepting or rejecting a VI connection request (VipConnectAccept or VipConnectReject), for terminating or disconnecting a connection between two VIs (VipDisconnect), to allow a process to register process memory with a VI NIC (VipRegisterMem), to post descriptors (to place a descriptor in a VI work queue using, e.g., VipPostSend, VipPostRecv), etc. Existing APIs to VI are targeted to user level applications. Details of the VI primitives (VIPL) are set forth in the VI Architecture Specification, version 1.0, Dec. 16, 1997 and the Virtual Interface (VI) Architecture Developer's Guide, Revision 1.0, Sep. 9, 1998.

The VI kernel agent 16 is the privileged part of the device's operating system, usually a driver supplied by the vendor of VI NIC, that performs the setup and resource management functions needed to maintain a virtual interface. These functions include the creation/destruction of VIs, VI connection setup/teardown, interrupt management and or processing, management of system memory used by the VI NIC 18 and error handling. In the model, VI kernel agent 16 is accessed using the standard operating system mechanisms such as system calls. As shown by arrow 26 (FIG. 6), the legacy interfaces 12 make system calls to the VI kernel agent 16 to perform several control operations, including to create a VI on the local system, to connect the local VI to a VI on a remote system, and to register memory. The user software process or application must register memory to be used for data transfer prior to submitting the request for data transfer. The memory regions used by descriptors and data buffers are registered prior to data transfer operations. Memory registration gives a VI NIC 18 a method to translate a virtual address to a physical address. The user receives an opaque memory handle as a result of memory registration. This allows a user to refer to a memory region using a memory handle/virtual address pair without worrying about crossing page boundaries and keeping track of the virtual address to tag mapping. Memory registration enables the VI NIC 18 to transfer data directly between the registered buffers and the network. Traditional network transports often copy data between user buffers and one or more intermediate kernel buffers. Thus, processing overhead is decreased in the VI Architecture because data transfers between the user software process or application and VI NIC 18 do not rely on system calls to the kernel.

After creating a VI on the local system, connecting the local VI to a remote VI and registering memory, legacy interfaces 12 or database applications 11 can use data transfer primitives of the VIPL library of VI user agent 14 to send and receive data. The VI Architecture defines two types of data transfer operations: 1) traditional send/receive operations, and 2) Remote-DMA (RDMA) read/write operations. Once a connection is established, the legacy interfaces 12 or database applications 11 post the application's send and receive requests directly to the local VI (to the send and receive queues). They then post descriptors (e.g., place the descriptors in a work queue) and ring a doorbell to notify the VI NIC 18 that work has been placed in the work queue. The doorbell can be rung (notify the VI NIC 18 of the work in the queue) without kernel processing. The VI NIC 18 then processes the descriptor by sending or receiving data, and then notifies the legacy interface 12 or database application 11 of the completed work using the completion queue 22. The processing of descriptors posted on a VI is performed in FIFO order but there is no implicit relationship between the processing of descriptors posted on different VIs. The VI NIC 18 directly performs the data transfer functions in response to the posted descriptors. This process removes the strict ordering between software layers in conventional network devices so that once the communication channel is established, the data is transferred more quickly.

The VI Architecture supports three levels of communication reliability at the NIC level: unreliable delivery, reliable delivery, and reliable reception. With reliable delivery and reception, corrupt data is detected, data is delivered exactly once, data order is guaranteed, data loss is detected and the connection is broken upon detection of an error. While providing high reliability, the VI architecture does not perform other transport level functions, including flow control, buffer management and fragmentation and reassembly. The VI Architecture Specification, version 1.0, Dec. 16, 1997 states at page 15 that "VI consumers are responsible for managing flow control on a connection." The transport service provider of the present invention is designed to provide some transport level functionality over the VI architecture or over an architecture similar to the VI architecture without adding unnecessary overhead.

3.0 Kernel Virtual Interface Provider Library (KVIPL)

Figure 8:
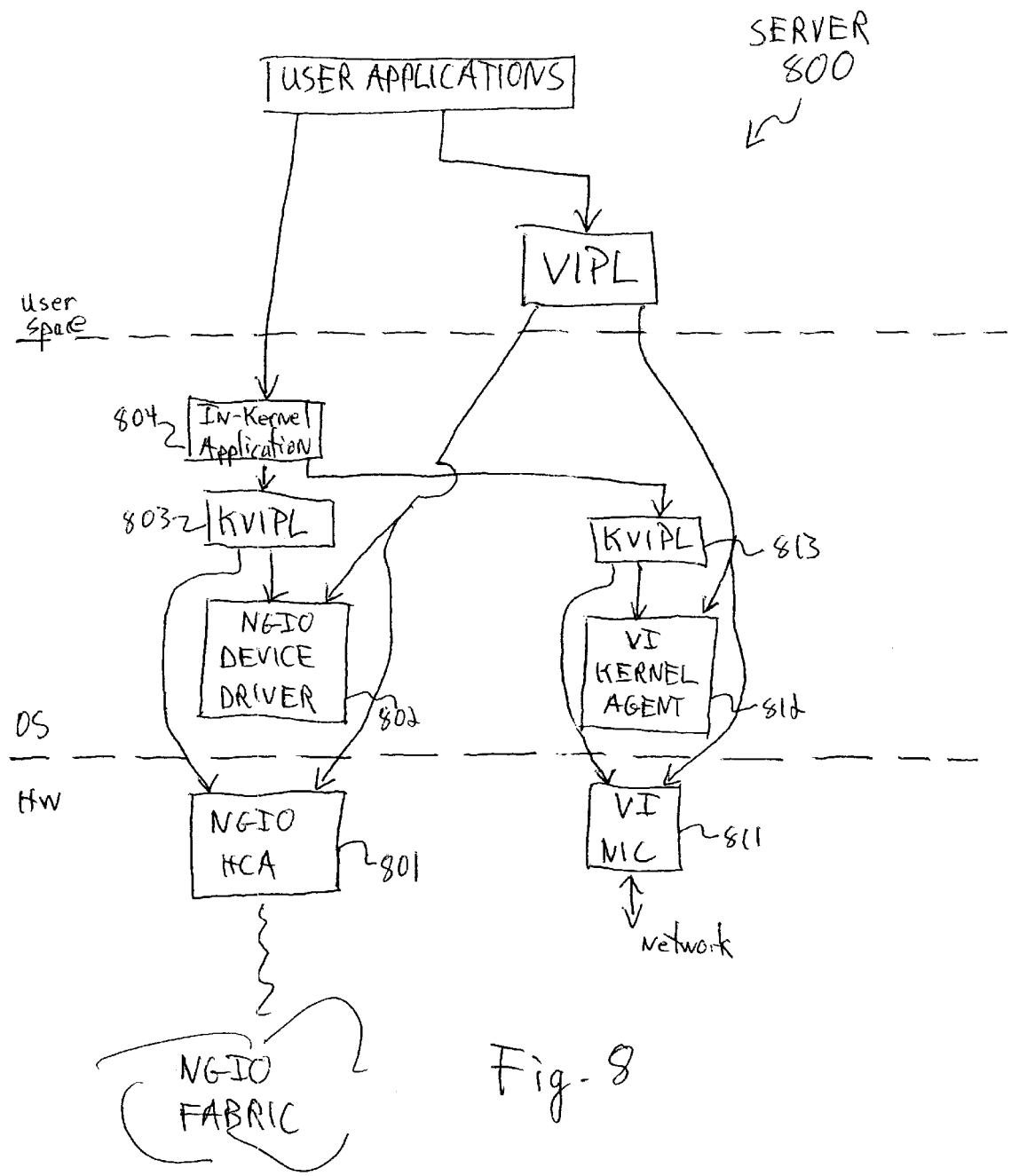
FIG. 8 illustrates an implementation of an example embodiment of the invention.

FIG. 8 shows an application of an example embodiment of the invention in a server 800 utilizing the VI architecture described above. One piece of VI NIC hardware is implemented as an NGIO host channel adapter (HCA) 801 connected to the network switching fabric. More particularly, the switching fabric configuration is preferably of a Next Generation I/O (NGIO) architecture allowing remote direct memory access and the server employs message passing in compliance with the NGIO standard, Version 1.0, published Jul. 22, 1999. (This application of the method and apparatus of the invention is exemplary only. The method and apparatus of the invention are also applicable to non-switched point-to-point connection links in other configurations or networks.) An NGIO control software (roughly analogous to a device driver) 802 has a specific relationship with HCA 801 and directly controls its functions. The Kernel Virtual Interface Provider Library (KVIPL) 803 shields an in-kernel application 804 from, and provides an interface with, NGIO control software 802. As shown in FIG. 8, the server could have another piece of VI NIC hardware 811, which could be a nonNGIO piece of hardware, and an associated VI kernel agent 812. A second KVIPL 813 is provided for VI NIC hardware 811. Second KVIPL 813 has the same semantics as KVIPL 803 so that the in-kernel application 804 could also use it to operate in conjunction with VI NIC hardware 811. Furthermore, unlike conventional network interfaces, VI enabled hardware has extra hardware to allow direct communication between it and an application. Therefore, KVIPL 803 may have direct communication with HCA 801 in a secure manner. Similarly, VI NIC 811 may have direct communication with KVIPL 813 in a secure manner.

The application software in the user level may include current programs such as Word, Excel, etc. and future software programs. The user level also includes VIPL 821 which also provides interfaces with hardware 801 and 811, control software 802 and VI kernel agent 812. Whereas KVIPL 803 and 813 provide an interface for applications inside of the operating system, VIPL provides an interface for user applications. Of course, the server 800 could have any number of different configurations, with NICs provided by different vendors. Similarly, although not shown in FIG. 8, other devices connected to the network could also different configurations. But, in any case, the in-kernel or user applications interface to the NIC of its server through a KVIPL or VIPL, respectively, and may transfer data to the in-kernel or user application of another device in a similar manner. For example, an in-kernel application of a server on the network might transfer data with a user application of another device on the network.

It is a particular aspect of the present invention that KVIPL 803 and KVIPL 813 utilize substantially the same way of programming, and have the same high level functionality, as VIPL 821. However, unlike the user space of VIPL 821, it is extremely important to avoid delays in the kernel space. Therefore, KVIPL 803 and 813 use some new methods in consideration of the kernel environment. For example, interrupts are important part of the operating system which make sure that the software is properly interlocked with the hardware and that no interrupts are missed and that queued processing is completed as soon as possible. The KVIPL in the example embodiment operates at a high level of performance, but in a way that allows kernel applications to keep their current semantics in terms of how they work within the operating system.

KVIPL 803 can be implemented as a module loaded as part of an operating system (such as Windows NT, Novell, Unix or Linux) and purposely linked to other drivers in the operating system. The in-kernel application 804 could dynamically attach itself to the software to use KVIPL 803. In that case, KVIPL becomes another module in the OS adding to the interfaces within the OS. For example, a module of an operating system could be using conventional transport software stacks to operate in conjunction with a device driver as discussed above in relation to FIG. 1. According to the example embodiment, that module could instead link to KVIPL 803.

Furthermore, most of the interfaces in an operating system have very specific functions, such a device driver that works with a specific disc drive. KVIPL 803 is a more general purpose interface and its features set allows new things to be done so that new applications can be written in the kernel. It attempts to avoid overhead associated with contemporary synchronous communication models in data networks and to provide a completely asynchronous interface for handling communication and error reporting without using callbacks. This is achieved by using low cost synchronization primitives offered by contemporary operating systems. KVIPL is specifically designed to meet the requirements of desired kernel applications and to be as consistent as possible with the Virtual Interface Provider Library (VIPL) defined in the Version 1.0 Intel VI Architecture Developer's Guide. A reference Application Programming Interface (API) also referred to as KVIPL (Kernel Virtual Interface Provider Library) for short, provides an interface between the kernel and the VI architecture, is attached to this specification as Appendix A.

Figure 9:
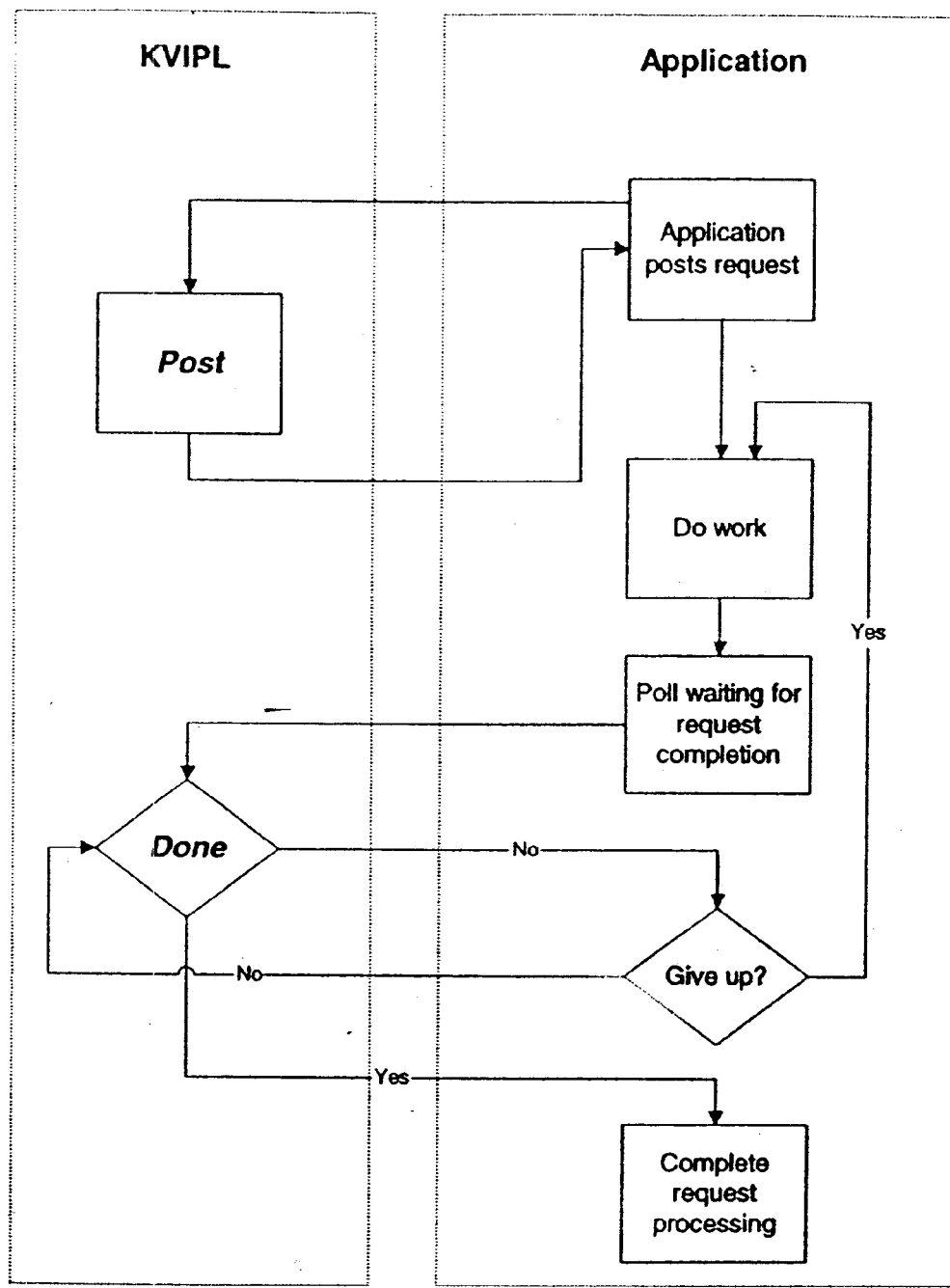
FIG. 9 is a block diagram providing a basic illustration of a polling method according to an embodiment of the present invention.
Figure 10:
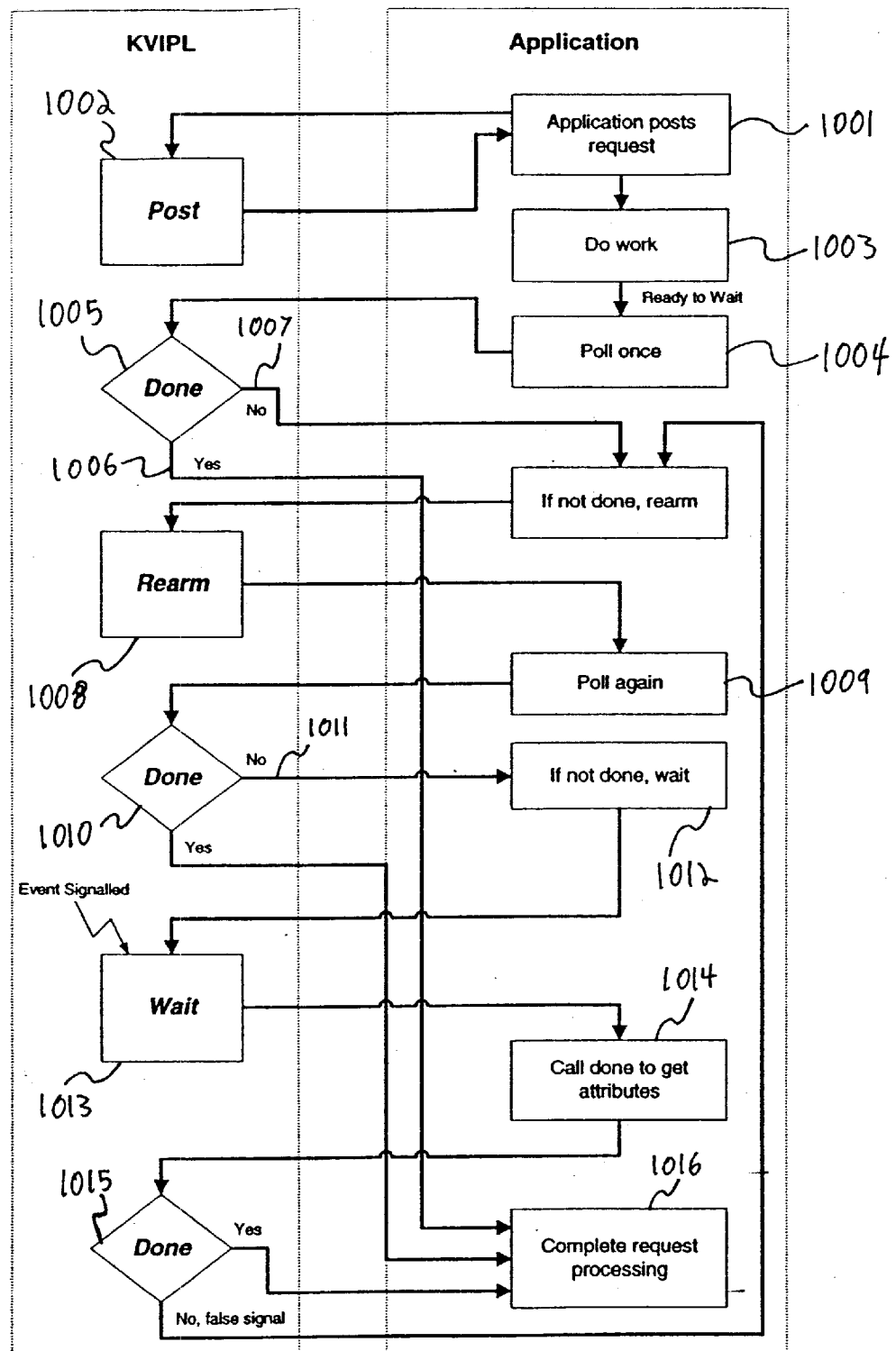
FIG. 10 is a generalized diagram providing a basic illustration of a wait method according to an embodiment of the present invention.

There are two models for allowing asynchronous access to the VI architecture—the polling model shown in FIG. 9 and the rearm-wait model shown in FIG. 10. These models are fundamental to a kernel interface's ability to provide a flexible and efficient interface to the VI architecture. An application using a kernel interface may use either of these models independently or in combination to suit its needs. Any kernel interface embodiment can benefit from using these models for all candidate asynchronous operations, especially one dealing with Connection Management, Data Transfer and Completion, as well as Error handling. Conventional models make extensive use of callbacks, which offer a convenient way for applications to be notified when an event of interest occurs. However, the example properties of callbacks listed in the Description of the Related Art manifest themselves into serious issues when trying to decrease execution time of the software.

Existing APIs to VI are targeted to user level applications. Hence such APIs, for e.g., the Virtual Interface Primitive Library (VIPL) primarily focus on providing primitives for synchronous communication with the VI hardware; the asynchronous operations being facilitated by means of callbacks as described above. Therefore, a need exists for a completely asynchronous interface to the VI architecture for handling communication and error reporting without using callbacks. This is achieved by using low cost synchronization primitives offered by contemporary operating systems.

The construct "KVIP_WAIT_OBJECT" is an abstraction of an OS independent asynchronous event object. Kernel interfaces can use this construct to be intimated of asynchronous event completion. In Microsoft Windows NT for example, KVIP_WAIT_OBJECT may be implemented by means of synchronization primitives such as Notification Events or Synchronization Events.

The example embodiment of the invention uses the notion of "rearm" to describe the ability to turn on asynchronous completion notification. Unless a completion notification is rearmed, the application will not get any intimation when that asynchronous operation completes. In the context of VI architecture, for example, this allows clients to turn off descriptor completion notification while all completed descriptors are being extracted. Doing so will minimize context switches each time these events get set and hence potentially improve performance. Once processing of these descriptors is complete, the kernel interface can rearm notification of the asynchronous event(s) and perform other tasks without (synchronously) waiting for the desired event to complete.

FIG. 9 depicts an example of how an application can utilize the polling model for a single request. It is possible to have multiple requests outstanding, but to simplify the figure only one request is shown. The figure is split to show the control flow between the application and the KVIP library (KVIPL).

This model allows a kernel interface freedom to poll for complete notification at will. IN addition, the system resources required for this approach are minimal—no additional threads (processes) or synchronization resources (events) are needed as compared to the Rearm-Wait model shown in FIG. 10. Note that between successive polling intervals in FIG. 9 (while the application is doing work,) the completion notification may already have arrived without the knowledge of the application. Given these characteristics, the model works best in the following situations:
1) the expected time to complete a request is very small;
2) the completion notification is not time critical.

FIG. 10 is an example of how an application could use a rearm-wait model for a single request. Note that it is possible to have multiple requests outstanding at once, but to simplify the figure only one request is shown. The figure is split to show the control flow between the application and the KVIPL library.

The model begins with the software application posting a request (1001) by calling the KvipPost routine (1002) in KVIPL. After a return from the KvipPost routine, the software application does work (1003) and then polls KVIPL (1004) by calling the KvipDone routine (1005). The KvipDone routine returns a yes value (1006) or a no value (1007). In the case of a no value (1 007), the software application calls the KvipRearm routine (1008). Immediately subsequent to the rearm routine, the software application agains polls KVIPL (1009) by again calling the Kvip-Done routine (1010). If a no value (1011) is returned by the KvipDone routine indicating that the event is not done, then the software application sends a call to KVIPL to wait (1012). When an event is signalled when waiting (1013), then the software application calls the KvipDone routine to get attributes (1014). If the KvipDone routine (1015) returns a no value, it is considered to be a false signal and the software application again calls the rearm routine (1008). If a yes value is returned by any of the KvipDone routines (The same software for the KvipDone routine can be used repeatedly, different numbers are assigned in FIG. 10 for the sake of clarity.), then the request processing is completed (1016).

The waiting model thus shows an example in which an application posts a request and does work until it must wait for the request to complete to do additional work. The polling may be done prior to and just after the Rearm routine is called in case the request is completed in the time window where the event signal would not be generated. Note that when the event signal occurs, the In a preferred embodiment of this approach, a KVIP_WAIT_OBJECT event object may be passed in as a parameter to an asynchronous operation call. After the kernel interface has polled unsuccessfully for event completion, the application can spawn an additional thread (process) to wait on the above event. In Windows NT for example, this can be easily accomplished by using the Win32 (user/kernel) API function WaitForSingleObject( ). This would free the main application thread (process) to perform other tasks. Once the event gets signaled, the additionally spawned thread (process) or the main application thread (process) can extract the attributes of the completed request by calling Done.

In an alternate embodiment of this approach:
1) Several independent KVIP_WAIT_OBJECT event objects may be passed in as parameters to various asynchronous operation calls required by the application;
2) An independent thread (process) may be spawned to wait on all the above events simultaneously. In Windows NT for example, this can be easily accomplished by using the Win32 (user/kernel) API function WaitForMultipleObjects( ). This allows "notification bundling" reducing the amount of system resources (CPU, threads, memory, etc.) required over both synchronous operations as well as callbacks.
3) Once any event gets signaled, the additionally spawned thread (process) or the main application thread (process) can extract the attributes of the completed request by calling Done.

Given these characteristics, the wait-rearm model works best in the following situations:
1) The expected time to complete a request is indeterminate, and often highly variable
2) The completion notification is time critical.

In summary, the kernel interface may use two models of asynchronous communication that allow kernel interface client applications to interact with the VI architecture. While the rearm-wait model is a more flexible approach to asynchronous completion notification than the polling model, it tends to be more resource intensive. The suitability of a particular model is dependent on the application requirements.

Although an example embodiment, the invention is not limited to a host server and VI architecture as illustrated in FIG. 8. Indeed, an advantage of the invention is that it may be particularly useful and widely adaptable to many network devices. In this way, data transfers can be made efficient by providing a kernel interface as discussed in the example embodiment. Of course, there is no need for the polling method and the waiting method to be used exclusively in kernel space. They may also be used in the user space. Indeed, the virtual interface provider library (VIPL) may be modified to include these methods.

Other features of the invention may be apparent to those skilled in the art from the detailed description of the example embodiments and claims when read in connection with the accompanying drawings. While the foregoing and following written and illustrated disclosure focuses on disclosing example embodiments of the invention, it should be understood that the same is by way of illustration and example only, is not to be taken by way of limitation and may be modified in learned practice of the invention. While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

What is claimed is:

1. A method of providing an interface between a software application and a hardware device transferring data between the software application and a network, said method comprising:
   posting a request from said software application in said interface;
   in response to a first polling inquiry received by said interface from said software application, determining whether or not an event signal for the request has been provided to the interface from the hardware device;
   carrying out a rearm routine in the interface if an event signal had not been provided at the time of said first polling inquiry;
   in response to a second polling inquiry received by said interface from said software application, determining whether or not an event signal has been provided to the interface from the hardware device; and
   carrying out a wait routine waiting for the event signal in the interface if an event signal had not been provided at the time of said second polling inquiry.

2. The method recited in claim 1, wherein the hardware device comprises a Virtual Interface (VI) architecture network interface controller (NIC).

3. The method recited in claim 2, wherein said interface is a kernel interface and said software application is a kernel application.

4. The method recited in claim 3, wherein a virtual interface is created for the data transfer between the software application and the VI NIC under the control of the kernel interface.

5. The method recited in claim 4, wherein the kernel interface provides asynchronous interaction with the VI NIC using synchronization primitives of a conventional operating system.

6. The method recited in claim 1, wherein said second polling inquiry is received immediately after the rearm routine is carried out.

7. A server configured to execute data communications between a software application in the server and a connected network, said server comprising:
   a hardware device passing data packets to and from the connected network;
   a kernel agent controlling said hardware device;
   a software interface providing an interface between said software application and said hardware device, said interface executing a method comprising:
     posting a request from said software application in said interface;
     in response to a first polling inquiry received by said interface from said software application, determining whether or not an event signal for the request has been provided to the interface from the hardware device;
     carrying out a rearm routine in the interface if an event signal had not been provided at the time of said first polling inquiry;
     in response to a second polling inquiry received by said interface from said software application, determining whether or not an event signal has been provided to the interface from the hardware device; and
     carrying out a wait routine waiting for the event signal in the interface if an event signal had not been provided at the time of said second polling inquiry.

8. The server recited in claim 7, wherein the hardware device comprises a Virtual Interface (VI) architecture network interface controller (NIC).

9. The server recited in claim 8, wherein said software interface is a kernel interface and said software application is a kernel application.

10. The server recited in claim 9, wherein said kernel interface is connected to said kernel agent and to said hardware device.

11. The server recited in claim 9, wherein a virtual interface is created for the data transfer between the software application and the VI NIC under the control of the kernel interface.

12. The server recited in claim 11, wherein the kernel interface provides asynchronous interaction with the VI NIC using synchronization primitives of a conventional operating system.

13. The server recited in claim 12, wherein the server comprises a second hardware device and a second kernel interface providing a software interface to said second hardware device.

14. The server recited in claim 13, wherein said second hardware device is different than said VI NIC and said second kernel interface is configured to allow said kernel application to interface with said second hardware device in the same manner as said first kernel interface.

15. The server recited in claim 7, wherein said second polling inquiry is received immediately after the rearm routine is carried out.

16. An article comprising:
   a storage medium;
   said storage medium including stored instructions that, when executed by a processor, result in providing a kernel interface between a software application and a hardware device transferring data between the software application and a network, by posting a request from said software application in said kernel interface, in response to a first polling inquiry received by said kernel interface from said software application, determining whether or not an event signal for the request has been provided to said kernel interface from said hardware device, carrying out a rearm routine in the interface if an event signal had not been provided at the time of said first polling inquiry, in response to a second polling inquiry received by said kernel interface from said software application, determining whether or not an event signal has been provided to the interface from said hardware device, and carrying out a wait routine waiting for an event signal in said kernel interface if an event signal had not been provided at the time of said second polling inquiry.

17. The article of claim 16, wherein the stored instructions, when executed by a processor, further result in creating a virtual interface for the data transfer between the software application and the VI NIC under the control of said kernel interface.

18. The article of claim 16, wherein the stored instructions, when executed by a processor, further result in providing asynchronous interaction between said kernel interface and the VI NIC using synchronization primitives of a conventional operating system.

19. The article of claim 16, wherein the stored instructions, when executed by a processor, further result in receiving said second polling inquiry immediately after said rearm routine is carried out.

* * * * *

UNITED STATES PATENT AND TRADEMARK OFFICE
CERTIFICATE OF CORRECTION

PATENT NO. : 6,742,051 B1
DATED : May 25, 2004
INVENTOR(S) : Bakshi et al.

It is certified that error appears in the above-identified patent and that said Letters Patent is hereby corrected as shown below:

Column 9,
Line 64, after "the", insert -- KvipDone routine must be called to be sure that the request has completed and to retrieve the attributes before the request processing can be completed --.

Signed and Sealed this

Twenty-second Day of February, 2005

JON W. DUDAS
*Director of the United States Patent and Trademark Office*